Feb. 17, 1970 C. W. DAVID ET AL 3,495,326

DISC PACK ASSEMBLER AND METHOD

Filed April 3, 1967 3 Sheets-Sheet 1

INVENTORS:
Charles W. David
Eugene A. Munson
Arlen E. DeGoes
By Smyth, Roston & Pavitt
ATTORNEYS INVENTORS:
Charles W. David
Eugene A. Munson
Arlen E. DeGoes
By Smyth, Roston & Pavitt
ATTORNEYS INVENTORS:
Charles W. David
Eugene A. Munson
Arlen E. DeGoes
By Smyth, Roston & Pavitt
ATTORNEYS United States Patent Office 3,495,326
Patented Feb. 17, 1970

3,495,326
DISC PACK ASSEMBLER AND METHOD

Charles W. David, El Segundo, Eugene A. Munson, Torrance, and Arlen E. DeGoes, Los Angeles, Calif., assignors to Disc Pack Corporation, Hawthorne, Calif., a corporation of California Filed Apr. 3, 1967, Ser. No. 628,145
Int. Cl. H01f 7/06
U.S. Cl. 29—604 18 Claims

ABSTRACT OF THE DISCLOSURE

The disclosure herein describes a method of assembling disc packs which includes stacking of various members of the disc pack on a mandrel assembly with the mandrel assembly axially aligning the members, securing the axially aligned members together while the members are on the mandrel assembly, and then retracting the mandrel assembly. The disc pack assembler of this invention includes a table having a plurality of retractable pins mounted thereon and extending upwardly therefrom. Several upwardly opening sockets and a central positioning member are also mounted on the table adjacent the pins. The elements of the disc pack are mounted on the mandrel with the center positioning member axially positioning the hub of the disc pack. The sockets lie beneath the disc pack and are utilized to retain nuts to permit the pack to be unitized with several bolts and nuts. The alignment of the pins can be checked with a gauge provided therefor and mounted on the table. After the disc pack has been assembled the pins are retracted so that they can not interfere with subsequent removal of the disc pack.

BACKGROUND OF THE INVENTION

As is well known, a memory disc is an annular plate-like member on which huge quantities of information can be stored and subsequently used in a data processing unit. In order that information can be properly recorded on the memory disc and in order that the memory disc can be eventually effectively used, it is very important that the disc be carefully guarded against contamination, scratches, and bending forces that would even slightly warp the disc.

It is common practice to secure several of these memory discs together in units known as disc packs. Disc packs include various other members, in addition to the memory disc, such as spacers, a hub, a sector disc, etc. Typically the memory discs are mounted in axially aligned spaced parallel relationship by the spacers and the hub projects radially inwardly of the inner periphery of the memory discs to define a driven surface engageable with a driving surface of a data processing unit for the purpose of rotating the entire disc pack.

Assembly of disc packs is difficult and presents peculiar problems because memory discs require careful handling and because of the many elements thereof that must be assembled. Furthermore, the memory discs of the disc pack must be spaced a predetermined distance from a datum plane and must be precisely axially aligned. In addition, the disc pack must be statically and dynamically balanced. Thus, any assembly procedure must accommodate all of these factors.

Assembly of the disc pack entirely by hand is very unsatisfactory because it requires considerable time and because it would be difficult or impossible to properly accurately axially align the elements of the disc pack. Furthermore, there is substantial danger of scratching the memory discs by sliding them along other elements of the disc pack in an effort to properly axially align the memory discs.

It is necessary therefore to use a mandrel assembly in assembling disc packs. Each of the disc pack elements has at least one aperture therethrough for cooperation with the mandrel assembly. The memory discs and the other disc pack elements are sequentially placed over the mandrel assembly with the mandrel assembly projecting through the apertures in the disc pack elements.

One problem that arises in connection with utilization of a mandrel assembly occurs during the removal of the assembled disc pack from the mandrel. The tolerances between the apertures in the disc pack elements and the mandrel assembly must, of necessity, be small in order to assure proper axial alignment of the elements of the disc packs. In attempting to remove the assembled disc pack from the mandrel assembly, the operator frequently will slightly tilt or incline the assembled disc pack and this causes the disc pack to bind on the mandrel assembly and arrest the removal operation. This increases the time and cost of assembly. More significantly however when such binding occurs, the operator, in a further attempt to remove the assembled disc pack, applies an undue amount of force thereon and thereby damages the relatively delicate disc pack. Frequently, the lowermost disc of the pack is grasped by the operator and lifted upwardly. Accordingly, it is the lowermost disc which would often be subjected to the damaging forces of the operator.

Another problem is presented by the varying and irregular geometry of the various disc pack elements. This makes design of an appropriately shaped mandrel assembly difficult and also makes proper axial alignment of the disc pack elements difficult to obtain.

SUMMARY OF THE INVENTION

The present invention provides for rapid assembly of the various elements of the disc pack in precise axial alignment. The present invention eliminates the problems of binding and resultant damage to the disc pack during the removal thereof from the mandrel assembly.

A basic teaching of the present invention is that the problems of binding and the accompanying danger of damage to the disc upon withdrawal thereof from the mandrel assembly can be solved by utilizing a precision mechanism to separate the assembled disc pack and the mandrel assembly. This can best be accomplished by retracting the mandrel assembly from the assembled disc pack. According to the present invention, the withdrawal movement of the mandrel assembly is carefully and automatically guided in a precision movement to avoid operator error.

The present invention is applicable to disc pack assembly generally and is particularly applicable to the assembly of a disc pack of the type including a plurality of memory discs and disc pack members or elements wherein each of the memory discs and disc pack members has an opening or aperture therein, defining a guiding surface.

Another teaching of this invention is the use of a mandrel assembly including several pins receivable within the apertures of the disc pack members to properly align the disc pack members. The use of several elongated small diameter pins solves the problem of the varying geometry of the various disc pack elements and allows assembly of a maximum number of components of the disc pack on the mandrel assembly.

Preferably the pins are parallel and extend generally perpendicularly from an assembly table. As the memory discs have a circular inner periphery defining a generally circular centrally located opening, the pins are preferably arranged in spaced relationship along a circular line which conforms to the circular inner periphery. Preferably all of the pins are mounted on a mounting plate to permit simultaneous retraction of the pins in a precision movement toward the assembly table without disturbing the assembled disc pack To assure that the pins will accurately maintain the desired alignment, a pin spacing gauge is provided. Although this gauge may take many different forms, it is preferred to utilize an apertured plate member in which the apertures are spaced and arranged to correspond to the appropriate axial positions for the pins. The gauge can be placed over the upper ends of the pins with the pins projecting through the apertures in the plate to align the pins and is movable to an inoperative position in which it is out of the way of the operator.

The present invention provides for securing together the various elements of the disc pack while they are mounted on the mandrel assembly. This may be accomplished by providing several upwardly opening sockets which are adapted to receive a fastening element such as a nut and retain it against rotational movement. The sockets lie beneath the disc pack and can be retracted along with the retractable pins.

The hub of the disc pack has lateral surface defining a downwardly opening generally conical recess. It is preferred to mount a central positioning member also having a conical lateral surface, on the assembly table for accurately axially aligning the hub. The hub also has a portion which extends radially outwardly of the conical recess thereof to form one of the spacers intermediate a pair of adjacent memory discs.

Another feature of this invention is making the central positioning member sufficiently large in cross-section so that the lateral surface thereof will support the hub with the lateral surface of the sheet resting on the conical lateral surface of the central positioning member. If the central positioning member were not this large in cross-section, the variations in manufacturing tolerances would in some instances, cause the recess of the hub to fit loosely over the central positioning member in which event, the hub may be able to move radially relative to the central positioning member thereby preventing the precise axial alignment which is required.

The invention, both as to its organization and method of operation together with further features and advantages thereof may best be understood by reference to the following description taken in connection with the accompanying drawings.

DESCRIPTION OF THE SPECIFIC EMBODIMENT

Figure 1:
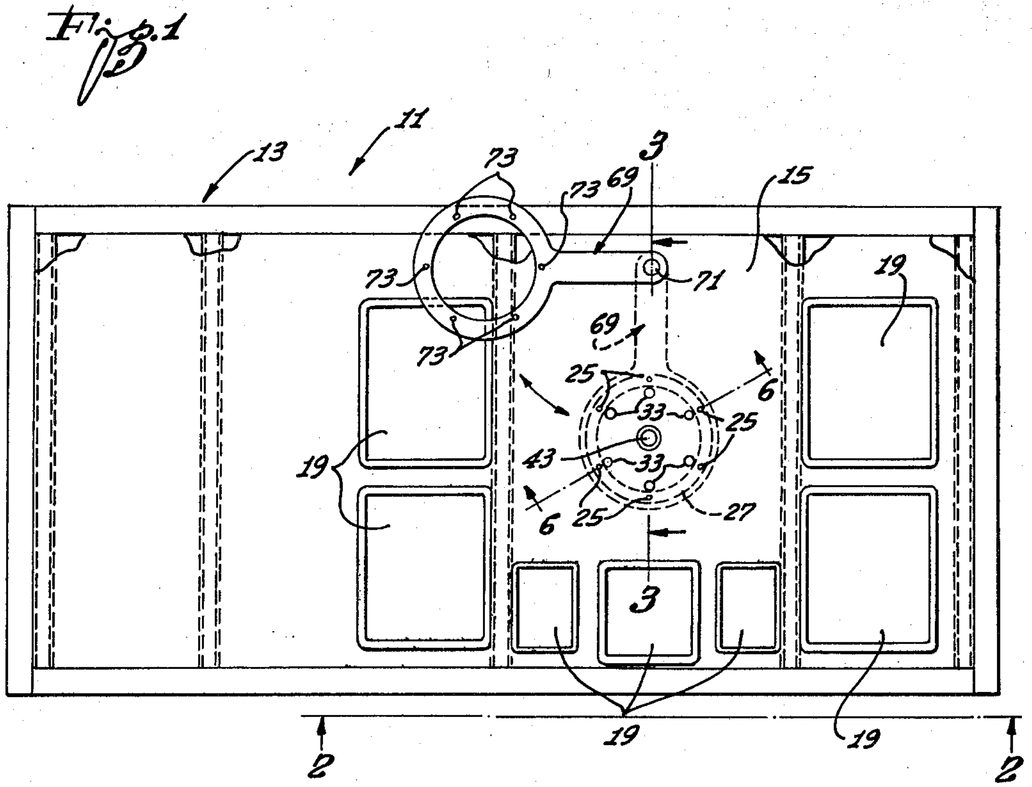
FIG. 1 is a top plan view of a disc pack assembler constructed in accordance with the teachings of this invention.
Figures 3, 4, 5:
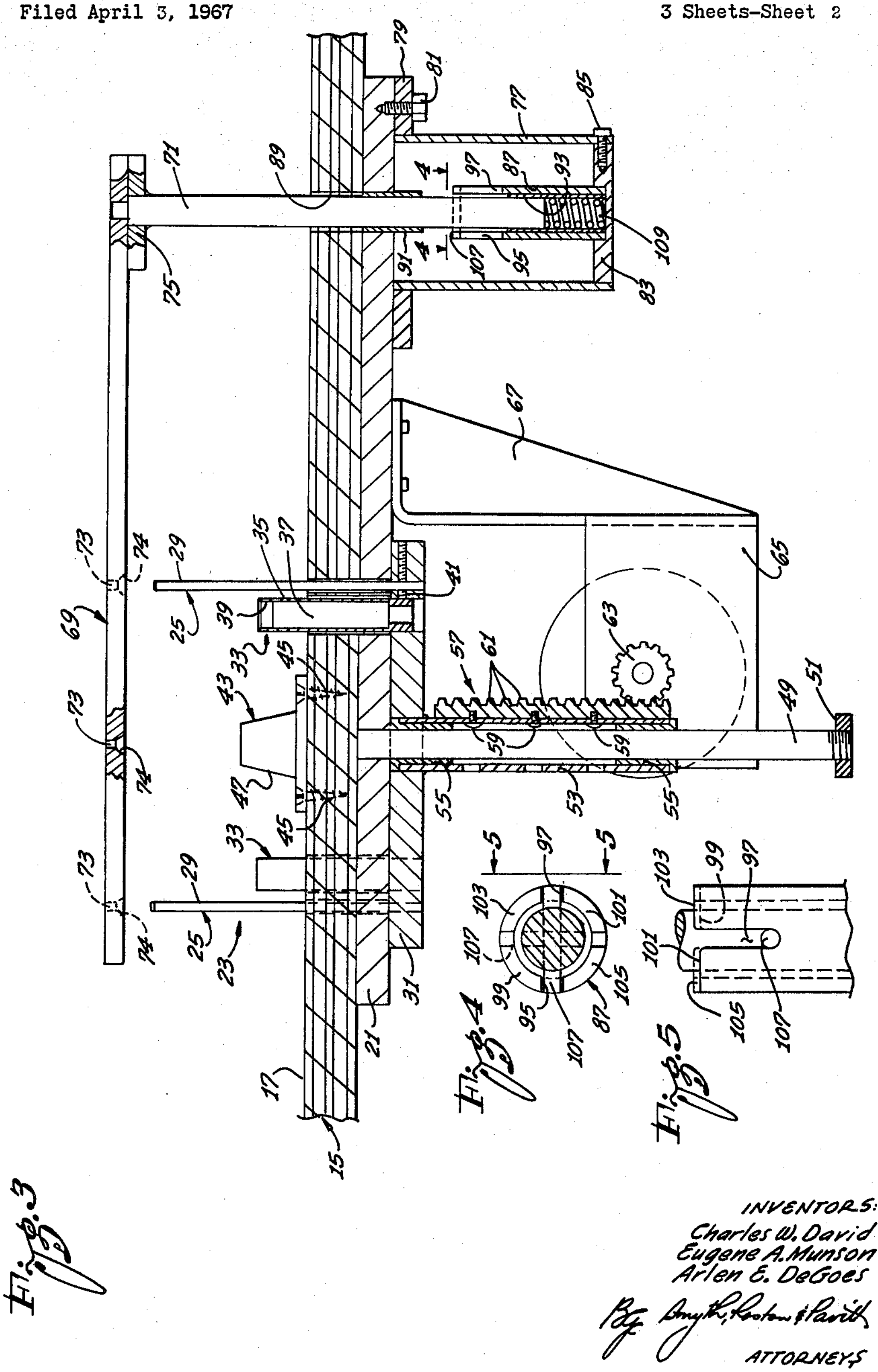
FIG. 3 is an enlarged fragmentary sectional view taken along line 3—3 of FIG. 1 with the spacer gauge just short of the operational position.
FIG. 4 is an enlarged sectional view along the line 4—4 of FIG. 3 and illustrating a detail of construction of the shaft for mounting the spacer gauge.
FIG. 5 is a fragmentary side elevational view taken along line 5—5 of FIG. 4.

Referring to the drawings and in particular to FIG. 1 thereof, reference numeral 11 designates a disc pack assembler constructed in accordance with the teachings of this invention. The disc pack assembler 11 includes an assembly table 13 of suitable construction and having a top wall or supporting member 15 having an upper surface 17 or assembly area (FIG. 3). A plurality of trays

Figure 2:
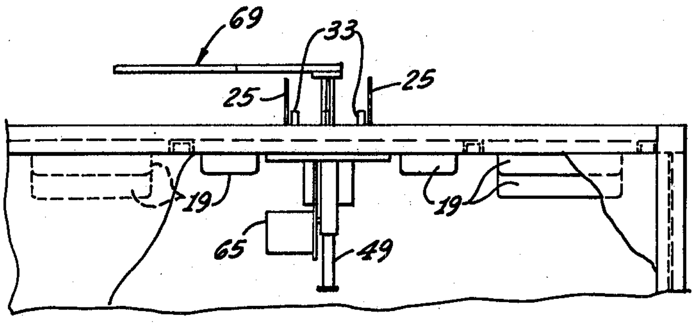
FIG. 2 is a fragmentary front elevational view taken along line 2—2 of FIG. 1 with portions of the assembly table being broken away to expose interior elements of the device.

19 for containing various parts which are to be assembled are arranged on the table 13 in any suitable manner which permits convenient access thereto by the operator. As shown in FIG. 1, the trays 19 may be of various sizes and shapes and in the embodiment illustrated are arranged in a channel-shaped configuration. The trays 19 are mounted on the top wall 15 of the assembly table 13 so that the upper ends thereof are substantially flush with or recessed in the top wall. The trays 19 project below the top wall 15 as shown in FIG. 2.

As best seen in FIG. 3, the region of the top wall 15 which is partially surrounded by the trays 19 is reinforced by a reinforcing plate 21 which is suitably secured to the top wall 15. A retractable mandrel assembly 23 which, in the embodiment illustrated, includes six elongated slender rigid pins 25, is mounted for movement relative to the assembly table 13. In the extended position shown in FIG. 3 the pins 25 project outwardly above the upper surface 17 in spaced parallel relationship. The pins 25 are perpendicular to the top wall 15 and to the upper surface 17 thereof and, are arranged in circumferentially spaced relationship along a circular line 27 (FIG. 1). As shown in FIG. 1, the pins 25 are arranged so that they lie inside of and tangent to the circular line 27 and are equally spaced 60° apart. The circular line 27 corresponds in size and shape to the circular inner periphery of a memory disc.

Each of the pins 25 has an outer end 29 (FIG. 3) and the inner ends of the pins 25 are rigidly affixed to a mounting plate 31 which, in the extended position shown in FIG. 3, abuts the lower face of the reinforcing plate 21. The pins 25 extend through apertures provided therefor in the top wall 15 and in the reinforcing plate 21.

Six upwardly opening sockets 33 are also secured to the mounting plate 31 and, in the extended position shown in FIG. 3, project through apertures provided therefor in the top wall 15 and the reinforcing plate 21. These sockets 33 project above the upper surface 17 a lesser distance than the pins 25. Each of the sockets 33 is spaced slightly radially inwardly from the adjacent pin 25 and are radially aligned with the associated adjacent pin 25. The sockets 33 are also arranged along a circular line having a lesser diameter than, but concentric with the circular line 27.

The pins 25 and the sockets 33 are advantageously sized and arranged for assembly of disc packs currently in use. It should be understood however that different arrangements of the pins 25 and the sockets 33 can be used to assemble the disc packs now in use. Furthermore, design changes in the disc packs themselves, may necessitate corresponding changes in the size, relative positions and shape of the pins 25 and the sockets 33.

Each of the sockets 33 includes a sleeve 35 having an aluminum bar 37 mounted therein and terminating short of the upper end of the sleeve. The upper end of the sleeve 35 defines a recess 37 of non-circular cross-section and of the type adapted to retain a fastener such as a nut against rotation. The lower end of the sleeve 35 is held in the mounting plate 31 by a set screw 41.

A central positioning member 43 is suitably secured to the top wall 15 as by screws 45. The central positioning member 43 is generally frustoconical and has a conical lateral surface 47. The central positioning member 43 is mounted on the top wall 15 so that the axis of the conical lateral surface 47 is coaxial with the circular line 27.

A cylindrical guide shaft 49 is mounted on the reinforcing plate 21 and depends therefrom coaxial with the central positioning member 43. A stop nut 51 is threaded on the lower end of the guide shaft 49.

A sleeve 53 is mounted in a central aperture in the mounting plate 31 and is rigidly secured to the mounting plate. The sleeve 53 is slidably mounted on the guide shaft 41 by a pair of sleeve bearings 55. A rack 57 is secured to the sleeve 53 by a plurality of screws 59. The rack 57 has vertically spaced teeth 61 thereon which mesh with the teeth of a pinion 63. The pinion 63 is rotationally driven by an electrical motor 65 which is mounted on a bracket 67 secured to the underside of the reinforcing plate 21. Thus, the motor 65 can drive the pins 25 and sockets 33 axially through the pinion 63, the rack 57, the sleeve 53, and the mounting plate 31. The motor 65 is reversible so that the pins 25 can be moved axially in either direction between an extended position shown in FIG. 3 in which the mounting plate 31 engages the reinforcing plate 21 and a retracted position in which the lower end of the lower sleeve bearing 55 engages the stop nut 51. The motor 65 is of the dead-stall type so that the external circuitry need not provide for opening of the current flowing thereto when the load moved thereby becomes immovable.

The pins 25 are rigid metal members and are not normally subject to becoming misaligned. However, it is desirable to periodically check the alignment and relative positions of the pins. Although this function may be accomplished in different ways, in the embodiment illustrated, a pin spacing gauge or alignment member 69 is provided. The gauge 69 is pivotally mounted on a shaft 71 for rotation between an inoperative position shown in full lines in FIG. 1 in which it is spaced laterally from the pins 25 and a second or operative position shown in phantom in FIG. 1 in which the gauge 69 is immediately above the pins 25. The gauge 69 is a plate-like member preferably constructed of a metal such as aluminum and has six calibrating apertures 73 extending vertically therethrough. The calibrating apertures 73 are arranged along a circular line and are of slightly larger diameter than the pins 25. The calibrating apertures 73 are spaced apart distances corresponding to the proper spacing for the pins 25 so that by lowering the gauge 69 over the pins 25, the pins 25 should project through their respective apertures 73 to facilitate insertion of the pins into apertures 73, each of the apertures 73 has a flared lower end 74.

It is important that the pin spacing gauge 69 be firmly held in order that it accurately checks the spacing and alignment of the pins 25. To this end, in the embodiment illustrated, a collar 75 is welded to the upper end of the shaft 71 and is also suitably rigidly secured to the inner end of the gauge 69. To further serve this end, the shaft 71 is firmly mounted on the assembly table 13. The mounting means for the shaft 71 includes a tube 77 having a flange 79 welded thereto which is suitably secured to the reinforcing plate 21 as by screws 81. The lower end of the tube 77 is closed by a plug 83 which is suitably attached to the tube as by screws 85.

The plug 83 has an upwardly opening axial cylindrical recess in which the lower end of a cylindrical mounting sleeve 87 is inserted. The mounting sleeve 87 is welded to the plug 83 and the axis thereof extends vertically. A hole 89 which is coaxial with the sleeve 87 is formed through the top wall 15 and the reinforcing plate 21 and the shaft 71 projects through the hole 89 and into the sleeve 87. Precise vertical alignment of the shaft 71 is maintained by sleeve bearings 91 and 93 which are provided in the opening 89 and the sleeve 87, respectively. The bearings 91 and 93 permit axial and rotational movement of the shaft 71.

It is important that the operative position of the gauge 69 be accurately marked so that the operator will know immediately when the operative position has been reached. Similarly, it is desirable to locate the inoperative position. To accomplish this, the upper end of the mounting sleeve 87 is formed with a pair of diametrically opposed axially extending elongated slots 95 and 97 (FIGS. 3–5). The slots 95 and 97 mark the operative position of the gauge 69. The sleeve 87 also has diametrically opposed upper end segments 99 and 101 positioned circumferentially in the clockwise direction from the slots 95 and 97, respectively. The end segments 99 and 101 are recessed slightly as shown in FIG. 5 and terminate in end segments 103 and 105, respectively, which are of full height as shown in FIG. 5. A pin 107 is secured to and extends transversely through the shaft 81 for cooperation with the upper end of the mounting sleeve 87. A coil spring 109 extends between the plug 83 and the lower end of the shaft 71 and pulls the shaft 71 downwardly.

Figure 6:
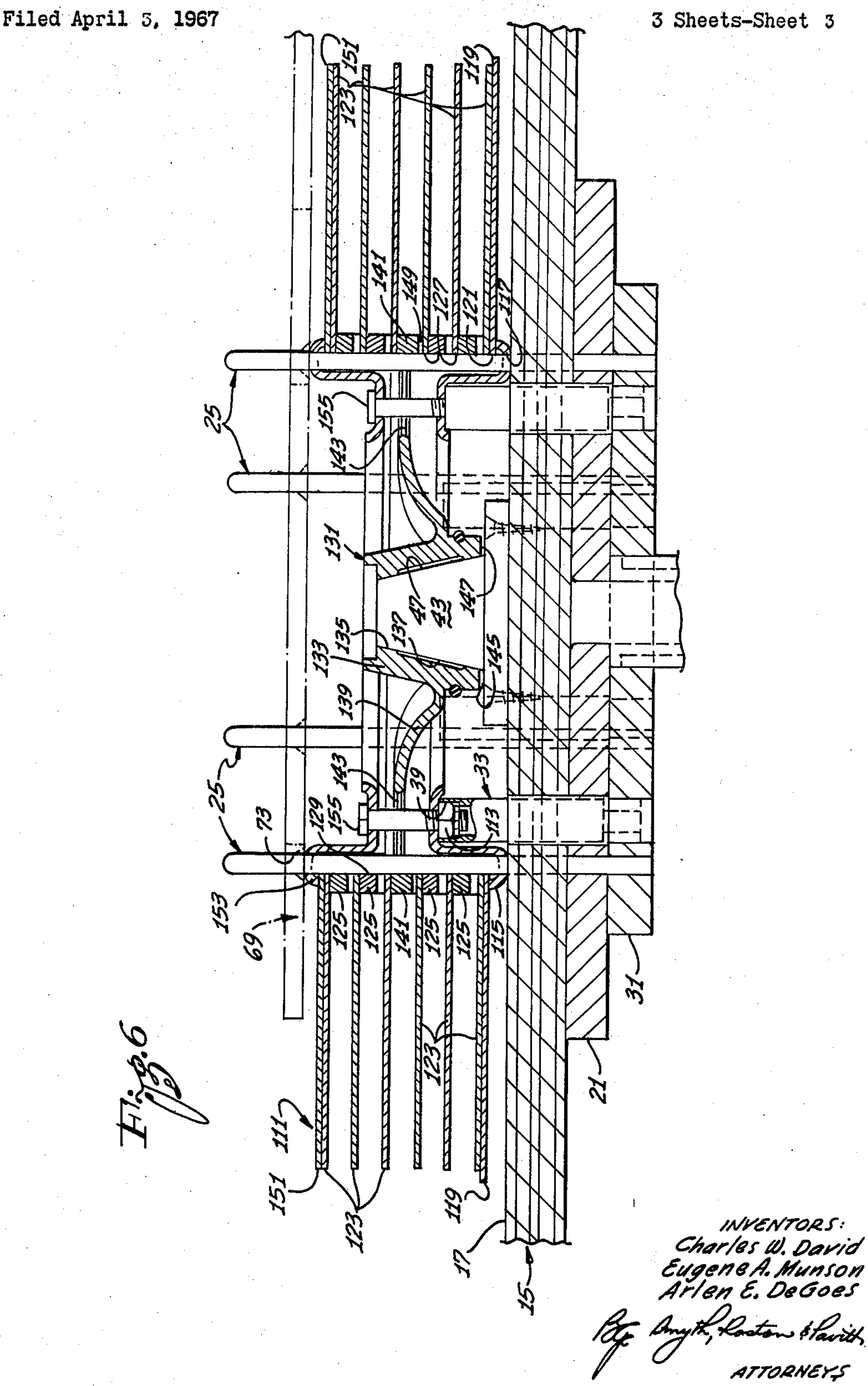
FIG. 6 is an enlarged fragmentary sectional view taken along line 6—6 of FIG. 1 and showing the use of the disc pack assembler in assembling a disc pack.

The segments 103 and 105 serve as stops to mark the inoperative position of the gauge 69, as shown in phantom in FIG. 4. The gauge 69 can be rotated counterclockwise from the inoperative position until the ends of the pin 107 fall off of the end segments 99 and 101 into the slots 95 and 97. FIG. 3 shows the position of the pin 107 just as it is to enter the slots 95 and 97 and FIGS. 4 and 5 show the pin seated in these slots. Thus, the slots 95 and 97 accurately mark the operative position. The spring 109 serves to urge the shaft 71 and hence the pin 107 downwardly into slots 95 and 97. The downward axial movement of the shaft 71 as the pin 107 falls into the slots 95 and 97 draws the gauge 69 downwardly so that the upper ends of the pins 25 are received in the aperture 73 as shown in FIG. 6 whereby the alignment and spacing of the pins is checked.

The concepts of this invention are, of course, applicable to the assembly of disc packs of varying design and construction. FIG. 6 illustrates the use of the disc pack assembler 11 in assembling a typical disc pack 111 of a design now in use.

Assuming that the gauge 69 is in the inoperative position and the pins 25 are in the extended position, the disc pack assembler 11 is ready for use. First, the operator places a nut 113 together with a washer, if desired, in the recess 39 of each the sockets 33 as shown in FIG. 6. Next, a lower clamp ring 115 which has one aperture 117 for each of the pins 25 is placed over the pins 25 with the pins extending through the apertures. As shown in FIG. 6 the lower clamp ring 115 is free to slide down the pins 25 until it engages the upper surface 17 of the top wall 15. Next, an annular sector disc 119 is placed over the pins 25 with the circular inner periphery 121 of the sector disc snugly embracing the pins 25. Three recording or memory discs 123 and two spacers 125 are alternately and sequentially placed over the pins 25 as shown in FIG. 6. Each of the memory discs 123 are annular and have a circular inner periphery 127 which embraces the pins 25. That is, the inner periphery 127 corresponds generally to the circular line 27 shown in FIG. 1. Each of the spacers 125 are also annular and has a circular inner periphery 129 embracing the pins 25.

A hub 131 is then installed. The hub 131 has a central portion 133 having a tapered preferably generally conical surface 135 forming a downwardly opening axial recess 137. The hub 131 also has a generally radially extending web portion 139 which terminates in a spacer ring 141. The web portion 139 has six circular holes 143 therein (only two being shown in FIG. 6) which are of considerably larger diameter than the pins 25. The holes 143 are positioned so that each of the holes receives one of the pins 25 as shown in FIG. 6. In this position, the pin 25 engages or is closely adjacent a portion of the rim of the hole 143 which is radially remote from the longitudinal axis of the hub 131.

The pins 25 and the holes 143 are operative to quite accurately position the hub 131. However, to assure precise alignment, it is desirable to provide the central positioning member 43. The central positioning member 43 receives the recess of the hub 131 and preferably is sufficiently large in cross-sectional area so that, notwithstanding production tolerances, the hub 131 will be supported by the lateral surface 47 of the central positioning member rather than by a lower flat surface 145 of the central positioning member or by the disc 123 immediately beneath the spacer ring 141. As shown in FIG. 6, the lower end 147 of the hub 131 is spaced upwardly slightly from the surface 145 and the spacer ring 141 is slightly above the upper surface of the memory disc 123 immediately therebelow to form a small space 149. By making the central positioning member 43 of sufficiently large cross-sectional area to assure that the conical lateral surface 47 thereof will support the hub 131, proper axial alignment of the hub is assured.

After the hub is placed over the pins 25 and on the central positioning member 43, three more recording discs 123 and two additional spacers 125 are alternatively placed over the pins 25. A cover disc 151 and an upper clamp ring 153 are then placed over the pins 25.

The alignment of the pins 25 can be checked as desired by the operator. For example, after the various elements of the disc pack 111 have been placed over the pins 25, the operator can pivot the gauge 69 from the inoperative position to the operative position. The pin 107 rides along the end segments 99 and 101 (FIG. 4) until the pin is pulled into the slots 95 and 97 by the weight of the gauges 69 and by the spring 109. The slots 95 and 97 mark the operative position and also automatically provide for movement of the gauge 69 axially toward the pins 25 to allow the aperture 73 to receive the pin aligned therewith. After the alignment and spacing of the pins 25 has been checked, the gauge 69 can be manually axially raised and pivoted to the inoperative position in which the pin 107 engages the end segments 103 and 105 as shown in FIG. 4.

In the next step of the assembly procedure, bolts 155 are inserted through the apertures provided therefor in the lower clamp ring 115 and in the upper clamp ring 153 and through the holes 143 of the hub 131. Utilizing an appropriate tool, the bolts 155 can be rotated to turn the nuts 131 thereon. This is permitted by the recesses 39 which hold the nuts 113 against rotational movement. Tightening of the nuts 113 draws the various elements of the device closely together and eliminates the space 149 which had heretofore existed between the spacer ring 141 and the disc 123 immediately therebelow.

The final step in the operation is to energize the motor 65 to cause simultaneous withdrawal of all of the pins 25 and sockets 33. This withdrawal movement is carefully guided and binding of the sockets 33 or the pins 25 with the disc pack 111 will not occur. The disc pack 111 is then manually removed from the assembly table 13 and the pins 25 and the sockets 33 can be automatically extended to allow assembly of another disc pack.

Although an exemplary embodiment of the invention has been shown and described, many changes, modifications, and substitutions may be made by one having ordinary skill in the art without necessarily departing from the spirit and scope of this invention.

We claim:

1. In a device for assembling a disc pack of the type including a plurality of disc pack elements with each of the disc pack elements having at least one opening therein defining a guide surface and wherein the disc pack elements are adapted to be secured together in stacked relationship, the combination of:

a supporting member;

a plurality of elongated generally parallel pins projecting outwardly of said supporting member, each of said pins terminating in an outer end, said pins being arranged to lie closely adjacent the guide surfaces of the disc pack elements when the disc pack elements are placed over said pins whereby when one of the disc pack elements is placed over said pins, the pins guide movement of said one disc pack element from the outer ends of the pins inwardly toward the supporting member to allow assembly of said disc pack elements in stacked relationship;

means for mounting said pins;

means for limiting the inward movement of the disc pack elements toward the supporting member; and means for moving one of the assembled disc pack elements and said pins generally axially relative to each other without any substantial tilting movement to remove the assembled disc pack elements from the pins.

2. A combination as defined in claim 1 wherein said means for moving includes motor means for retracting said pins substantially simultaneously from the assembled disc pack elements.

3. A combination as defined in claim 1 including means for aligning said pins.

4. In a device for assembling a disc pack of the type including a plurality of memory discs and disc pack members wherein each of the memory discs has a central opening therein defining an inner periphery of the memory disc and each of the disc pack members has at least one aperture therein defining a guide surface and wherein the memory discs and the disc pack elements are adapted to be secured together in stacked relationship, the combination of:

an assembly table having an upwardly facing assembly area thereon;

a plurality of elongated generally parallel pins mounted on said table for generally axial movement relative thereto, said pins extending outwardly from said assembly area generally perpendicular thereto, each of said pins terminating in an outer end, said pins being arranged to lie closely adjacent the inner periphery of the memory discs and the guide surfaces of the disc pack member when said memory discs and disc pack members are placed over said pins whereby when one of said memory discs is placed over said pins, the pins guide the movement of said one memory disc from the outer ends of the pins inwardly toward the assembly area to allow assembly of the memory discs and the disc pack members in stacked relationship; and means for moving said pins generally axially toward said assembly area to a retracted position in which the assembled memory discs and the disc pack members can be removed without interference from the pins.

5. A combination as defined in claim 4 wherein the last mentioned means includes a mounting plate having said pins mounted thereon and means for moving said mounting plate to simultaneously move said pins to said retracted position.

6. A combination as defined in claim 5 including a guide shaft secured to said assembly table and depending therefrom and a sleeve mounted on said guide shaft and connected to said mounting plate whereby movement of said sleeve along said guide shaft causes movement of said pins to said retracted position.

7. A combination as defined in claim 4 wherein the inner periphery of each of the memory discs is circular and said pins are arranged along a circular line generally conforming to the circular inner periphery, and a central positioning member is mounted on said table concentric with said circular line.

8. A combination as defined in claim 4 including a pin spacing gauge having a plurality of apertures therein for receiving the outer ends of said pins, said apertures being spaced and arranged to correspond with the appropriate axial positions for the pins.

9. A combination as defined in claim 4 including a plurality of upwardly opening sockets mounted on said table at said assembly area, each of said sockets being adapted to receive a fastening member for securing the memory discs and disc pack members together in stacked relationship.

10. In a device for assembling a disc pack of the type including a plurality of disc pack elements and a hub wherein each of the disc pack elements has at least one opening therein and the hub has a tapered surface defining a downwardly opening generally axially recess of progressively increasing cross-sectional area as the recess extends downwardly, the combination of:

an assembly table having an upwardly facing surface;

a central positioning member mounted on said upwardly facing surface and projecting upwardly therefrom, said central positioning member having a lateral surface tapering radially inwardly as it extends away from said upwardly facing surface;

a mandrel assembly mounted on said table and at least partially receivable within the openings of the disc pack elements for aligning the disc pack elements in stacked axial relationship, said mandrel being capable of sequentially receiving a first group of said disc pack elements, said hub, and a second group of the disc pack elements; and said central positioning member being sufficiently large in cross-section to cause the lateral surface thereof to support said hub with the tapered surface of the hub resting on said lateral surface, to allow said lateral surface to accurately axially position the hub.

11. In a method of assembling a disc pack of the type including a plurality of memory disc members and disc pack members wherein each of the memory disc members has an inner periphery defining an opening therethrough and each of said disc pack members includes at least one aperture therein defining a guide surface, the steps of:

stacking the memory disc members and the disc pack members on a mandrel assembly in the desired order with at least a portion of said mandrel assembly projecting into said openings and apertures of said members to thereby axially align the members and form a disc pack unit;

supporting the disc pack unit with said members thereof in stacked relationship on the mandrel assembly;

securing said members of the disc pack together in axially aligned stacked relationship while the members are on said mandrel assembly to form an assembled disc pack unit; and retracting said mandrel assembly from the assembled disc pack unit to thereby avoid binding of the assembled disc pack unit on the mandrel assembly during separation of the assembled disc pack unit and the mandrel assembly.

12. A method as defined in claim 11 wherein said step of securing includes utilizing fastening elements retained in fastener holders beneath the assembled disc pack units and including the step of retracting said fastener holders following said step of securing to leave said fastening elements on the assembled unit.

13. A method as defined in claim 11 wherein the mandrel assembly includes a plurality of pins for projecting into said apertures and openings of said members and including the step of accurately aligning each of said pins.

14. A method as defined in claim 12 wherein the fastener holders and the mandrel assembly are retracted simultaneously.

15. A method of assembling a disc pack of the type including a plurality of memory disc members and disc pack members wherein each of the memory disc members has an inner periphery defining an axial opening therein and each of said disc pack members has at least one aperture therein, said method comprising:

providing a mandrel assembly including a plurality of pins arranged in a pattern which generally conforms to said inner periphery of the memory disc members;

stacking the memory disc members and the disc pack members on the mandrel assembly with all of the pins projecting through at least some of said openings and with at least some of the pins projecting through at least some of said apertures to thereby accurately align the members;

fastening the members together in aligned stacked relationship while the members are on said mandrel assembly to form an assembled disc pack unit; and retracting said pins from said openings and said apertures to thereby avoid binding of the assembled disc pack unit on the pins during separation of the disc pack unit and the pins.

16. A method as defined in claim 15 wherein the outer ends of said pins project beyond said members and including the step of positioning said outer ends of said pins to assure that said pins project through said members at the desired orientation.

17. A method as defined in claim 16 wherein said step of positioning includes inserting said outer ends of said pins into aperture means in a pin alignment member to thereby accurately position said pins.

18. A method as defined in claim 17 wherein said desired orientation is generally axially of said openings and apertures.

References Cited

UNITED STATES PATENTS

| | | | |
|---|---|---|---|
| 3,111,651 | 11/1963 | Foulkes. | |
| 3,266,126 | 8/1966 | Dowling | 29—604 |
| 3,339,261 | 9/1967 | Der Voo. | |
| 3,374,525 | 3/1968 | Petry. | |

THOMAS H. EAGER, Primary Examiner

U.S. Cl. X.R.

29—203; 340—174